US 8,238,257 B2

(12) United States Patent
Huff

(10) Patent No.: US 8,238,257 B2
(45) Date of Patent: *Aug. 7, 2012

(54) AUTO-SELECTION OF SGMII OR SERDES PASS-THROUGH MODES

(75) Inventor: Gary S. Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/840,645

(22) Filed: Jul. 21, 2010

(65) Prior Publication Data

US 2010/0284419 A1 Nov. 11, 2010

Related U.S. Application Data

(63) Continuation of application No. 10/230,158, filed on Aug. 29, 2002, now Pat. No. 7,787,387.

(60) Provisional application No. 60/398,587, filed on Jul. 26, 2002, provisional application No. 60/365,806, filed on Mar. 21, 2002.

(51) Int. Cl.
*H04L 12/26* (2006.01)
*G01R 31/08* (2006.01)
*H04B 10/12* (2006.01)

(52) U.S. Cl. ............. 370/248; 398/25; 398/28; 398/115

(58) Field of Classification Search .................. 370/241, 370/242, 244, 245, 248–252, 419, 420, 463; 709/223, 224

See application file for complete search history.

(56) References Cited

U.S. PATENT DOCUMENTS 4,862,452 A 8/1989 Milton et al.
5,095,308 A 3/1992 Hewitt
5,541,929 A 7/1996 Jokura
(Continued)

FOREIGN PATENT DOCUMENTS

EP 0 573 204 A2 12/1993
(Continued)

OTHER PUBLICATIONS

Search Report for European App. No. EP 03006502.3, dated Aug. 12, 2003, completed Aug. 5, 2003, by Lai, C., 3 pgs.
(Continued)

*Primary Examiner* — Hassan Phillips
*Assistant Examiner* — Duc Duong
(74) *Attorney, Agent, or Firm* — Sterne, Kessler, Goldstein & Fox, P.L.L.C.

(57) ABSTRACT

Methods and systems for operating a physical layer device ("PHY") in an Ethernet network include methods and systems for detecting active link partners and for selecting a mode of operation based on detected active link partners, without user intervention. The PHY monitors fiber link media and copper link media for active link partners. The PHY selects a mode of operation according to detected active link partners. For example, a serial gigabit media independent ("SGMII") mode of operation is selected when an active copper link partner is detected and an active fiber link partner is not detected. Similarly, a serialize/deserialize ("SerDes") pass-through mode of operation is selected when an active fiber link partner is detected and an active copper link partner is not detected. The PHY interfaces with the active copper link partner when the SGMII mode of operation is selected. Conversely, the PHY interfaces with the active fiber link partner when the SerDes pass-through mode of operation is selected. The SGMII or SerDes pass-through mode of operation can be prioritized for when active copper and fiber link partners are detected. The prioritized mode can be user selectable or factory set. The invention optionally powers down circuitry associated with an unselected mode of operation.

25 Claims, 5 Drawing Sheets

U.S. PATENT DOCUMENTS

| | | | |
|---|---|---|---|
| 5,577,023 A | 11/1996 | Marum et al. | |
| 5,768,301 A | 6/1998 | Dreyer et al. | |
| 5,774,814 A | 6/1998 | Haas | |
| 5,790,946 A | 8/1998 | Rotzoll | |
| 5,907,553 A | 5/1999 | Kelly et al. | |
| 6,026,494 A | 2/2000 | Foster | |
| 6,065,073 A | 5/2000 | Booth | |
| 6,215,764 B1 | 4/2001 | Wey et al. | |
| 6,393,050 B1 | 5/2002 | Liu | |
| 6,418,558 B1 | 7/2002 | Roberts et al. | |
| 6,442,142 B1 | 8/2002 | Bar-Niv | |
| 6,459,393 B1 | 10/2002 | Nordman | |
| 6,487,214 B1 | 11/2002 | Bachar | |
| 6,516,352 B1 | 2/2003 | Booth et al. | |
| 6,678,728 B1 | 1/2004 | Uppunda et al. | |
| 6,691,233 B1 | 2/2004 | Gannage et al. | |
| 6,697,368 B2 | 2/2004 | Chang et al. | |
| 6,718,139 B1 | 4/2004 | Finan et al. | |
| 6,735,244 B1 | 5/2004 | Hasegawa et al. | |
| 6,812,803 B2 | 11/2004 | Goergen | |
| 6,819,760 B1 | 11/2004 | Nayler | |
| 6,868,088 B2 | 3/2005 | Gibson et al. | |
| 6,894,602 B2 | 5/2005 | Browning | |
| 6,912,485 B2 | 6/2005 | Lightfoot et al. | |
| 6,999,543 B1 | 2/2006 | Trinh et al. | |
| 7,020,728 B1 | 3/2006 | Jones et al. | |
| 7,024,489 B2 | 4/2006 | Aviles | |
| 7,027,459 B2 | 4/2006 | Fukui et al. | |
| 7,054,309 B1 | 5/2006 | Hoot et al. | |
| 7,058,833 B1 | 6/2006 | Bremer et al. | |
| 7,079,528 B2 | 7/2006 | Ziegler et al. | |
| 7,119,701 B2 | 10/2006 | Browning | |
| 7,127,624 B2 | 10/2006 | Berman et al. | |
| 7,149,397 B2 | 12/2006 | Popovic et al. | |
| 7,203,174 B2 | 4/2007 | Huff | |
| 7,227,875 B2 | 6/2007 | Deng | |
| 7,242,693 B1 * | 7/2007 | Acharya et al. | 370/445 |
| 7,257,169 B2 | 8/2007 | Shahar et al. | |
| 7,283,481 B2 | 10/2007 | Huff | |
| 7,324,507 B1 | 1/2008 | Lo et al. | |
| 7,334,068 B2 | 2/2008 | Huff | |
| 7,362,797 B2 | 4/2008 | Chan et al. | |
| 7,486,721 B2 | 2/2009 | Chan et al. | |
| 7,688,812 B1 * | 3/2010 | Lo et al. | 370/360 |
| 7,706,433 B2 | 4/2010 | Chan et al. | |
| 7,787,387 B2 | 8/2010 | Huff | |
| 2001/0033583 A1 | 10/2001 | Rabenko et al. | |
| 2002/0019954 A1 | 2/2002 | Tran | |
| 2002/0023234 A1 | 2/2002 | Berman et al. | |
| 2002/0061012 A1 | 5/2002 | Thi et al. | |
| 2003/0002505 A1 * | 1/2003 | Hoch et al. | 370/392 |
| 2003/0112798 A1 | 6/2003 | Ziegler et al. | |
| 2003/0149922 A1 | 8/2003 | Lai | |
| 2003/0179709 A1 | 9/2003 | Huff | |
| 2003/0179710 A1 | 9/2003 | Huff | |
| 2003/0179816 A1 | 9/2003 | Huff et al. | |
| 2005/0111531 A1 | 5/2005 | Booth et al. | |
| 2007/0022310 A1 | 1/2007 | Berman et al. | |
| 2007/0086478 A1 * | 4/2007 | Lee | 370/463 |
| 2008/0069004 A1 | 3/2008 | Huff | |

FOREIGN PATENT DOCUMENTS

| | | |
|---|---|---|
| EP | 0 856 975 A2 | 8/1998 |
| EP | 0 856 975 A3 | 8/1998 |
| EP | 0 963 080 A2 | 12/1999 |
| EP | 1 480 391 A3 | 9/2007 |
| WO | WO 00/59176 A2 | 10/2000 |
| WO | WO 00/59176 A3 | 10/2000 |
| WO | WO 01/47159 A1 | 6/2001 |
| WO | WO 03/081785 A1 | 10/2003 |

OTHER PUBLICATIONS

Search Report for European App. No. Ep 03006503, dated Sep. 29, 2003, completed Sep. 19, 2003, 3 pgs.

Final/Partial Search Report for European App. No. EP 03006504, dated Sep. 29, 2003, 2 pgs.

Search Report for European App. No. EP 03006505, dated Sep. 29, 2003, completed Sep. 19, 2003, 3 pgs.

Search Report for European App. No. EP 1 480 391 A3, dated Aug. 2, 2007, 2 pgs.

Search Report for PCT Application No. PCT/US03/08684, mailed Jul. 28, 2003, completed Jun. 19, 2003, by Duong, Frank, 7 pgs.

10 Gigabit Ethernet Technology Overview White Paper, Revision 1.0, 10GEA: 10 Gigabit Ethernet Alliance, pp. 1-21 (May 2001).

Design Considerations for Next Generation LAN and SAN Gigabit Ethernet Switches, Cicada Semiconductor and SwitchCore Corp., pp. 1-13 (Jun. 2001).

BCM5411 10/100/1000 Base-T Transceiver Product Brief, Broadcom Corporation, 2 pages, Copyright 2001.

"Power Management Method for Portable Personal Computer with Modem", IBM Technical Disclosure Bulletin, vol. 38, No. 2, pp. 259-260, Feb. 1995.

Complex programmable logic device, online at http://en.wikipedia.org/wiki/CPLD, 2 pages, last modified Jul. 1, 2007.

* cited by examiner

AUTO-SELECTION OF SGMII OR SERDES PASS-THROUGH MODES

CROSS-REFERENCE TO RELATED APPLICATIONS

This patent application is a continuation of U.S. application Ser. No. 10/230,158, filed Aug. 29, 2002, now U.S. Pat. No. 7,787,387, which claims the benefit of U.S. Provisional Application Ser. No. 60/398,587, filed Jul. 26, 2002, and to U.S. Provisional Application Ser. No. 60/365,806, filed Mar. 21, 2002, all of which are incorporated herein by reference in their entirety.

BACKGROUND OF THE INVENTION

1. Field of the Invention

The present invention is directed to Ethernet communication systems and, more particularly, to Ethernet physical layer devices.

2. Related Art

Ethernet is a widely used technology in local area networks ("LAN") and other computer networks. The Institute for Electrical and Electronics Engineers ("IEEE") has developed standards for Ethernet communication systems. See, for example, IEEE 802.3, incorporated herein by reference in its entirety. The IEEE 802.3 standards have been adopted by the International Organization for Standardization ("ISO"), making the IEEE 802.3 standards worldwide standards.

In an Ethernet network, a computer utilizes an Ethernet transceiver to transmit and receive signals between the computer and a network. The transceiver typically interfaces with the network via a physical link medium, such as copper or fiber.

An Ethernet transceiver typically includes a media access controller ("MAC") that interfaces with applications running on the computer. Alternatively, an Ethernet module can include a switch or an optical module. An Ethernet transceiver also includes a physical layer device, or "PHY" that interfaces between the MAC/switch and a physical link media. PHYs typically interface with physical link media using serialized data streams. PHYs typically interface with MACs/switches using packet-based interfaces.

PHYs can be designed to interface with any of a variety of types of physical link medium (e.g., copper or fiber). PHYs can also be designed to interface with MAC/switches through any of a variety of interface format.

What is needed is a PHY that can selectively interface with MAC/switches in any of a plurality of modes, and that can selectively interface with any of a plurality of types of physical link media, depending upon the availability of active link partners.

BRIEF SUMMARY OF THE INVENTION

The present invention is directed to methods and systems for operating a physical layer device ("PHY") in an Ethernet network. More particularly, the present invention is directed to methods and systems for detecting active link partners and for selecting a mode of operation corresponding to detected active link partners, without user intervention.

In accordance with the invention, a PHY has copper and fiber ports for coupling to copper and fiber link media. An electrical/optical converter typically interfaces the fiber port with the fiber link media. The PHY further includes a fiber signal detect node for coupling to a fiber signal detect output port of the electrical/optical converter. The fiber signal detect node receives a fiber signal detect indication from the electrical/optical converter. The PHY is thus able to monitor the fiber link media for an active fiber link partner.

The PHY further includes copper link detect circuitry that allows the PHY to monitor a copper link media for an active copper link partner. The PHY is thus able to monitor/detect both the fiber link media and the copper link media for active link partners.

In accordance with the invention, the PHY selects a mode of operation corresponding to detected active link partners. For example, a serial gigabit media independent ("SGMII") mode of operation is selected when an active copper link partner is detected and an active fiber link partner is not detected. Similarly, a serialize/deserialize ("SerDes") pass-through mode of operation is selected when an active fiber link partner is detected and an active copper link partner is not detected.

The PHY then interfaces with the active copper or fiber link partner in the selected mode of operation. For example, the PHY interfaces with the active copper link partner when the SGMII mode of operation is selected. Similarly, the PHY interfaces with the active fiber link partner when the SerDes pass-through mode of operation is selected.

The invention optionally provides a prioritized mode of operation for when active copper and fiber link partners are detected. The prioritized mode can be user-selectable or factory set. The invention optionally powers down circuitry associated with an unselected mode of operation.

The invention optionally provides a prioritized mode of operation for when no active copper or fiber link partners are detected. The prioritized mode can be user-selectable or factory set.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

DETAILED DESCRIPTION OF THE INVENTION

Table of Contents

Figure 1:
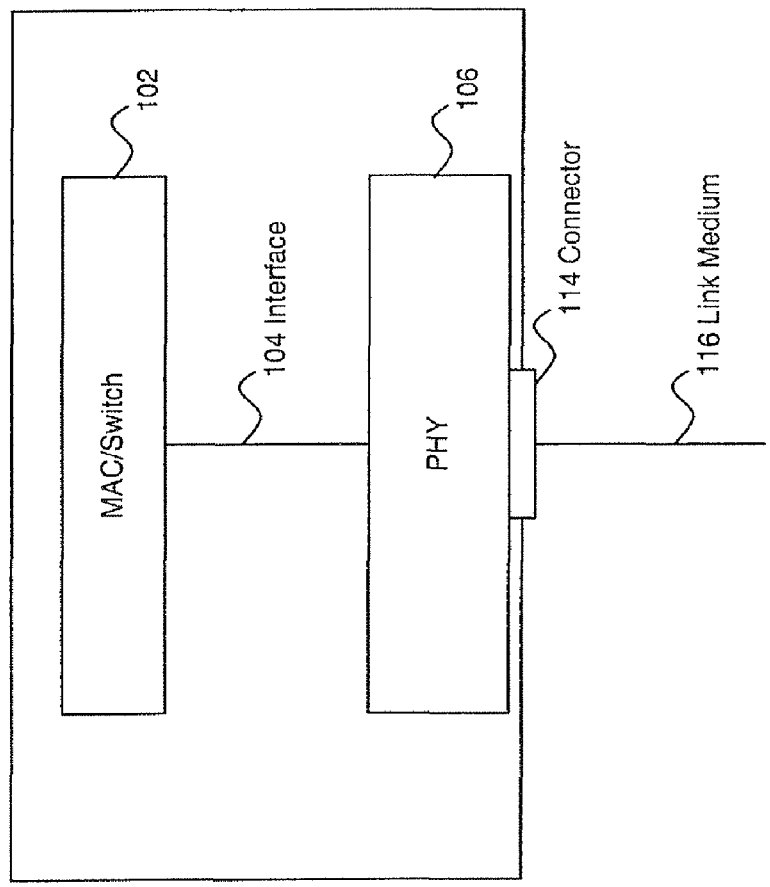
FIG. 1 is a high-level block diagram of an Ethernet transceiver 100.

I. Introduction
II. Detecting Active Copper and Fiber Link Partners

III. SGMII Mode
IV. SerDes Pass-Through Mode
V. Mode Selection
VI. Powering Down Unselected Media
VII. Methods for Detecting Active Link Partners, for Selecting a Mode of Operation, and for Powering Down Unselected Media
VIII. Integration in a Multi-Mode PHY
IX. Conclusion I. Introduction The present invention is directed to an Ethernet transceiver physical layer device ("PHY") that serially interfaces with a link device, such as a MAC, switch, optical device, or the like ("MAC/switch"), and that selectively interfaces with a copper or a fiber physical link media depending upon the presence of active link partners coupled to a remote end of the physical link media.

Methods and systems for simultaneously monitoring for active link partners on copper and fiber link mediums are taught in, for example, co-pending U.S. application Ser. No. 10/230,160, titled, "Auto Detection of Copper and Fiber Mode," filed on Aug. 29, 2002, and incorporated herein by reference in its entirety. This involves a PRY attached to a MAC/switch through a Gigabit Media Independent Interface "(GMII"). The GMII interface involves approximately 22 pins.

In accordance with the invention, in order to reduce pin count, a PHY interfaces with a MAC/switch through a serializer/deserializer ("SerDes") interface. In an example implementation, the SerDes interface includes a 1.25 Gbaud data signal with a 625 MHz clock. The PHY includes a DDR interface, which is described below. Each signal is generated as a differential signal pair to provide signal integrity and to minimize noise. The invention is not, however, limited to this example.

In accordance with the invention, the three speeds operated by the GMII interface (i.e., 10, 100, and 100 megabits per second), are supported for backward compatability. The SerDes interface selectively operates in either serial GMII ("SGMII") mode or 1000-X mode. The present invention monitors a copper link media and a fiber link media for active link partners, and selects a link media according to logic described below. When the copper link media is selected, the PHY interfaces with a MAC/Switch in SGMII mode. When the fiber link media is selected, the PHY interfaces with the MAC/Switch in 1000-X mode. In the latter scenario, the PHY, or a portion thereof, is powered down and the PHY interfaces between the MAC/switch and the fiber link media using a new SerDes pass-through transceiver. The SerDes pass-through transceiver is taught in co-pending U.S. application Ser. No. 10/347,295, titled, "A Physical Layer Device Having a SerDes Pass-Through Mode," filed Jan. 1, 2003, and incorporated herein by reference in its entirety.

In order for the MAC/switch to interface with the PHY in the selected mode (i.e., SGMII or 1000-X), the PHY notifies the MAC/switch of the selected mode.

The invention is further directed to a PHY that includes SGMII capability and a new serialize/deserialize ("SerDes") pass-through mode. The SerDes pass-through mode is described in co-pending U.S. application Ser. No. 10/347, 295, titled, "A Physical Layer Device Having a SerDes Pass-Through Mode," filed Jan. 1, 2003, and incorporated herein by reference in its entirety. The PHY selectively operates in an SGMII or SerDes pass-through mode, depending upon whether active fiber and/or copper link partners are detected.

Logic for selecting between copper link media and fiber link media is now described. When an active copper link partner is detected and an active fiber link partner is not detected, the PHY selects the copper link and interfaces with the MAC/switch in SGMII mode. Conversely, when an active fiber link partner is detected and an active copper link partner is not detected, the PHY selects the fiber link partner and interfaces with the MAC/switch in the 1000-X mode.

The invention allows the fiber or copper link medium to be prioritized so that when both the fiber link partner and the copper link partner are active, the PHY will select the prioritized physical link medium. Circuitry associated with the non-prioritized physical link medium and/or an unselected mode of operation, is optionally powered down to conserve power.

FIG. 1 is a block diagram of an Ethernet transceiver, or module 100, wherein a MAC/switch 102 interfaces with a PHY 106 via a serial interface 104. The serial interface 104 can be a SGMII or a 1000-X serial interface. The PHY 106 is coupled to a physical link media 116 by a connector 114. As described below, the physical link media 116 includes a copper link media and a fiber link media.

Figure 2:
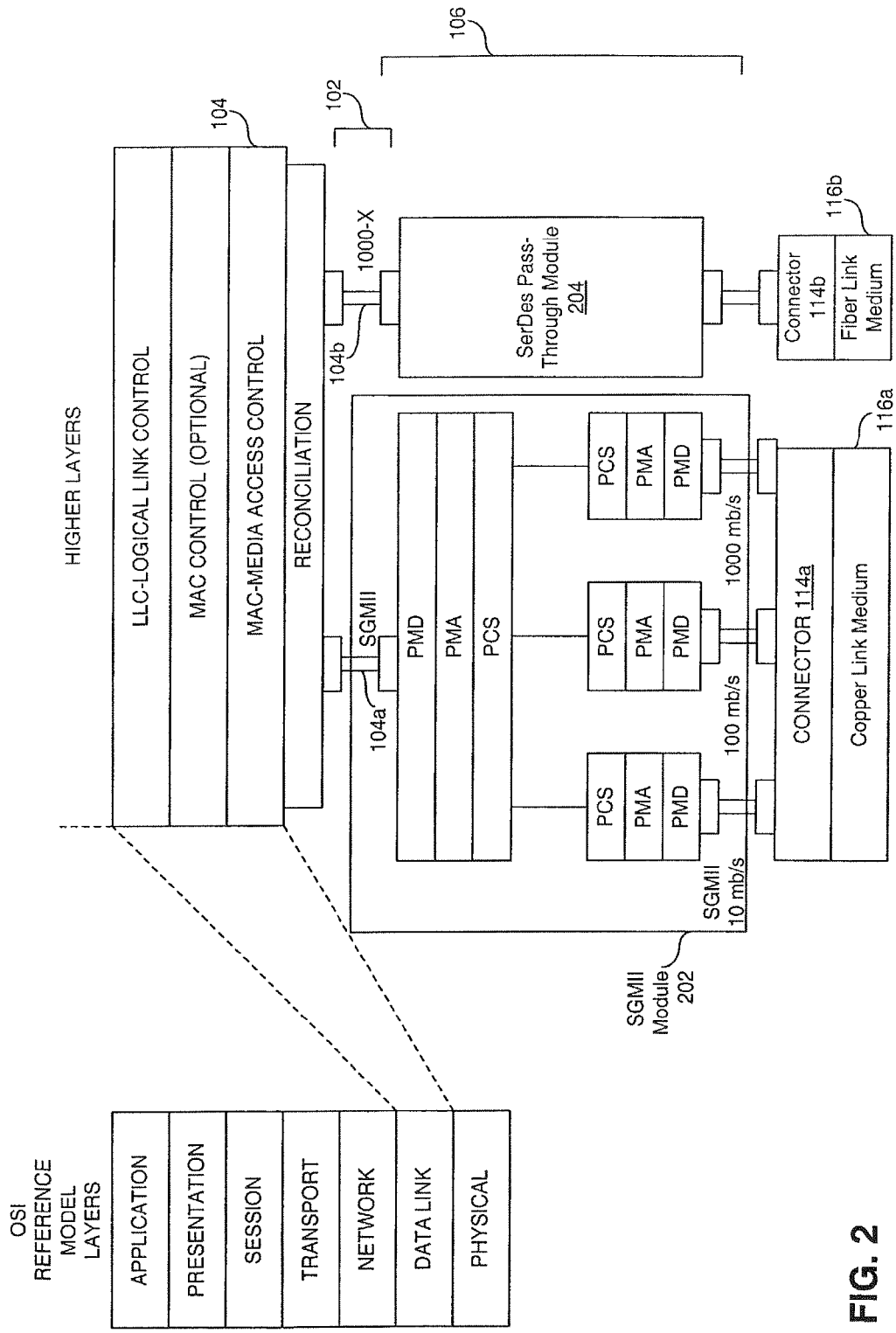
FIG. 2 is a detailed block diagram of an example embodiment of the Ethernet transceiver 100.

On the MAC/Switch 102 side, the PHY 106 receives serial transmit signals from the MAC/switch 102. The PHY 106 deserializes the transmit signals to recover encoded parallel data. The parallel data is processed within the PHY 106 to recover the transmitted data. The decoded transmitted data is then sent out on the physical link media 116. On the physical link media 116 side, the PHY 106 receives data from the physical link media link 116, serializes it, and sends it to the MAC/switch 102. FIG. 2 is a detailed block diagram of an example embodiment of the Ethernet module 100, wherein the MAC 102 interfaces with the PHY 106 via a SGMII or 1000-X interface 104.

In FIG. 2, the PHY 106 includes an SGMII module 202 and a SerDes pass-through module 204. The SGMII module 202 includes physical coding sub-layers ("PCSs"), physical medium attachment sub-layers ("PMAs"), and physical medium dependent sub-layers ("PMDs"), all of which are well known to those skilled in the relevant art(s). The PCSs provide services including encoding/decoding of data for communication with the PMAs. The PMAs provide a medium independent platform for the PCSs to support the use of a range of serial-bit-oriented physical media links. The PMDs implement signaling in accordance with, for example, IEEE and/or ANSI standards.

PMDs associated with the copper link can include signal processing circuitry such as, for example, and without limitation, echo cancellation, cross-talk cancellation, equalization, timing and/or phase recovery, gain control, and baseline wander correction. Such signal processing can be used, for example, to improve signal-to-noise ratios ("SNR") and "eye" openings of signals sent to and/or received from the copper link media 116a.

The Ethernet module 100 further includes a copper connector 114a, such as an RJ45 connector, that connects the PHY 106 to a copper link medium 116a. The Ethernet module 100 also includes a fiber connector 114b that connects the PHY 106 to a fiber link media 116b. The fiber connector 114b typically includes an optical-to-electrical converter.

The example Ethernet module 100 illustrated in FIGS. 1 and 2 are provided for illustrative purposes. The present invention is not limited to these examples. Based on the description herein, one skilled in the relevant art(s) will understand that the invention can be implemented in other types of Ethernet modules as well.

II. Detecting Active Copper and Fiber Link Partners

Figure 3:
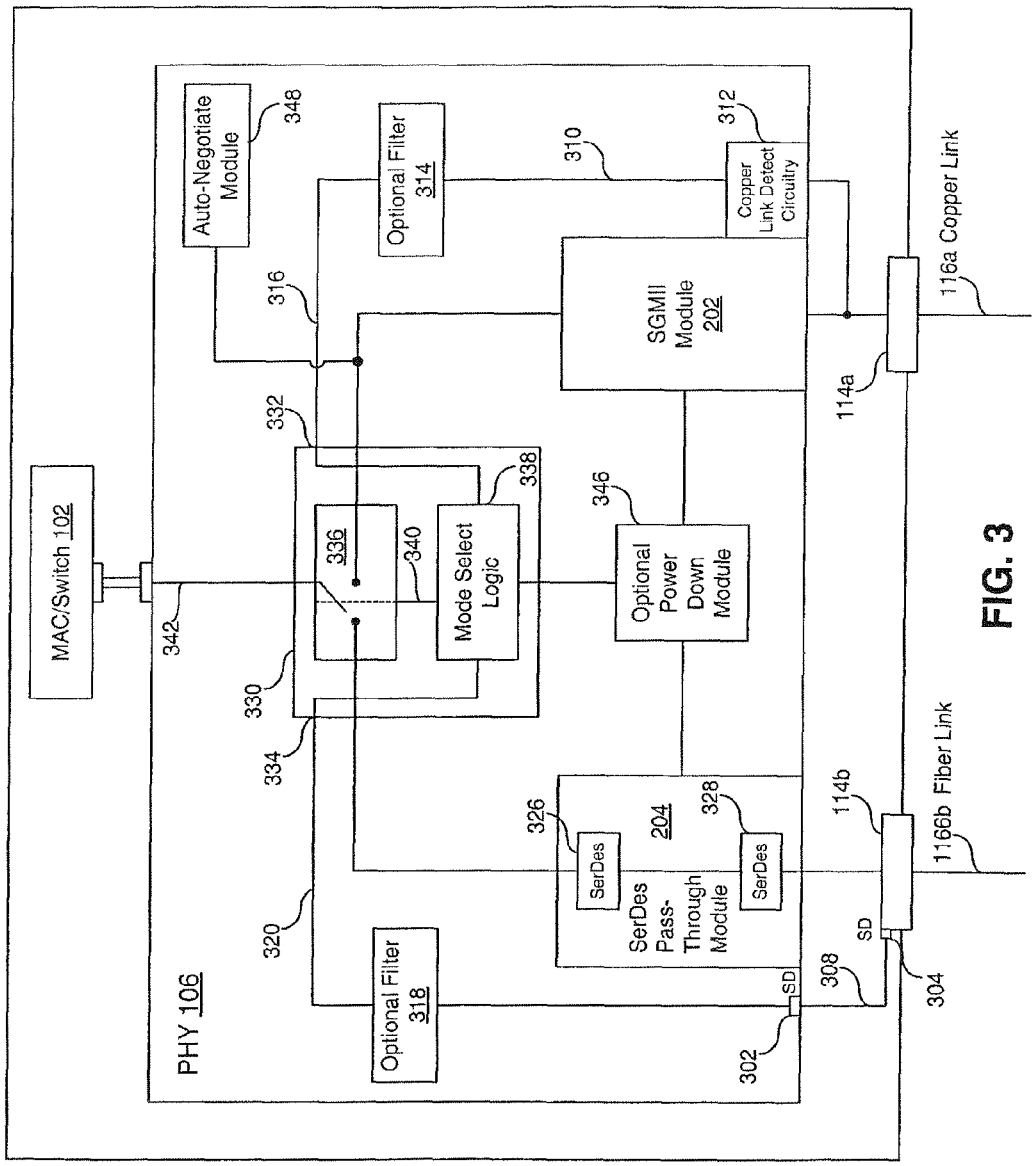
FIG. 3 is a block diagram of the Ethernet module 100, including copper link detect circuitry 312 and a fiber signal detect ("SD") node 302, in accordance with the invention.

Methods and systems for detecting active link partners are now described. The resulting information can be used to select between SGMII and SerDes Pass-Through modes of operation, for powering down unselected media, and/or for other purposes. FIG. 3 is a block diagram of the Ethernet module 100, wherein the PHY 106 includes, among other elements, copper link detect circuitry 312 and a fiber signal detect ("SD") node 302.

The fiber SD node 302 is now described. Recall from above that the fiber connector 114b typically includes an optical/electrical converter. Conventional optical-to-electrical converters include a fiber SD output port, illustrated here as fiber SD output port 304. The fiber SD output port 304 is active when an intensity of an optical signal on the fiber link media 116b is above a threshold. The fiber SD output port 304 is coupled to the fiber SD node 302. When the intensity of the optical signal on the fiber link media 116b is above the threshold, an active fiber SD signal 308 is provided from the fiber SD output port 304 to the fiber SD node 302. The PHY 106, thus, detects active fiber link partners.

The copper link detect circuitry 312 is now described. The copper link detect circuitry 312 includes circuitry that detects whether a copper link partner is active on the copper physical link media 116a. In the example of FIG. 3, the copper link detect circuitry 312 is coupled to a node between the SGMII module 202 and the copper connector 114a. Alternatively, the copper link detect circuitry 312 is coupled to the copper connector 114a, the copper link 116a, and/or to the SGMII module 202.

The copper link detect circuitry 312 detects whether a copper link partner is active on the copper physical link media 116a. When an active link partner is detected by the copper link detect circuit 312, the copper link detect circuit 312 outputs a copper link detect signal 310. The copper link detect circuitry 312 can be implemented, for example, as disclosed in one or more of the following U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and/or Ser. No. 10/231,066, titled, "Auto Powerdown for Forced Speed Modes," filed Aug. 30, 2002.

All of which are incorporated herein by reference in their entireties. The invention is not, however, limited to the embodiments disclosed therein.

The PHY 106 illustrated in FIG. 3 thus detects whether there is an active link partner coupled to the fiber connector 114b and/or to the copper connector 114a, without user and/or software intervention. After active link partners are detected, the Ethernet module 100 can utilize the detection information for one or more of a variety of purposes, including, without limitation, selecting an appropriate mode of operation and/or powering down circuitry associated with an unselected mode, both of which are described below.

The PHY 106 optionally includes a copper link detect signal filter 314 and/or a fiber SD signal filter 318. The copper link detect signal filter 314 includes circuitry for filtering and/or debouncing the copper link detect signal 310. The copper link detect signal filter 314 outputs a filtered copper link detect signal 316. The fiber SD signal filter 318 includes circuitry for filtering and/or debouncing the fiber SD signal 308. The fiber SD signal filter 318 outputs a filtered fiber SD signal 320.

III. SGMII Mode

An example implementation of the SGMII module 202 is now described. The SGMII module 202 uses 2 data signals and 1 clock signal to convey frame data and link rate information between the PHY 106 and the MAC/switch 102. The data signals operate at 1.25 Gigabaud, and the clocks operate at 625 MHz, double data rate ("DDR"). DDR utilizes both rising and falling edges of the clock signal. The signals are preferably implemented as differential pairs to improve signal integrity and to minimize system noise.

When the MAC/switch 102 operates below 1000 speed (e.g., 10 Mbps or 100 Mbps), the PHY 106 and/or the MAC/switch 102, elongates a frame by replicating each frame byte 10 times for 100 Mbps and 100 times for 10 Mbps. This frame elongation typically takes place above the PCS, in accordance with IEEE 802.3z, so that a start frame delimiter appears only once per frame.

At the receive side, the PHY 106 passes the signals from the copper link 116a through the PCS. The PHY 106 serializes the PCS data to create an SGOUT± pin signal pair, and sends it to the MAC/switch 102 at 1.25 Gbps data rate along with the 625 MHz DDR SCLK± pin signal pair.

At the transmit side, the PHY 106 de-serializes data received from the MAC/switch 102 at the SGIN± pin to recover encoded parallel data. The PHY 106 passes parallel data through a receive state machine within the PCS to recover the transmit signals. The decoded transmit signals are passed through a transmit block and are output to the copper link 116a with predetermined speed.

When the PHY 106 detects a link change from the copper link partner, the PHY 106 starts a PHY/MAC auto-negotiation process, using a PHY/MAC auto-negotiation module 348 (FIG. 3), and sends updated control information to the MAC/switch 102. The SGMII module 202 uses the PHY/MAC auto-negotiation module 348 to pass control information to the MAC/switch 102, to notify the MAC/switch 102 of the change in link status. The MAC/switch 102 receives and decodes control information and starts the auto-negotiation process.

IV. Serdes Pass-Through Mode

The SerDes pass-through Module 204 is now described. When the PHY 106 serially interfaces with the MAC/switch 102, the PHY 106 typically performs a number of processes on the data, such as de-serializing, de-packetizing, and decoding processes. Another PRY at a remote end of the physical link reverses the processes (e.g., packetizing, encoding, and re-searializing the data). This is necessary for copper physical link media because the data needs to be reformatted for transmission over copper wires. A fiber cable, however, can accommodate 1000-X data without decoding/de-packetizing the data from the MAC/switch. Thus, for fiber link media, at least some of the processes performed by the PHYs are unnecessary. Variations between clock rates in the MAC/switch 102 and a remote fiber link partner, however, prevent a direct connection between the MAC/switch 102 and the remote fiber link partner.

Accordingly, the new SerDes pass-through mode has been developed, as taught in the co-pending U.S. application Ser. No. 10/347,295, titled, "A Physical Layer Device Having a SerDes Pass-Through Mode," filed Jan. 1, 2003, and incorporated above by reference in its entirety. In the example of FIG. 3, the SerDes pass through mode is implemented within the SerDes pass-through module 324. When selected, the SerDes pass-through module 324 interfaces with the MAC/switch 102 through a 1000-X interface.

The SerDes pass-through module 324 includes a first serializer/de-serializer ("SerDes") 326 and a second SerDes 328. Data transmitted from the MAC/switch 102 to the PHY 106 is de-serialized by the first SerDes 326 and then re-serialized by the second SerDes 328 for transmission over the fiber link 116b. Similarly, data received from the fiber link 116b is de-serialized by the second SerDes 328 and re-serialized by the first SerDes 326. The first and second SerDes 326 and 326 operate with a unique clocking scheme that compensates for variations between clock rates in the MAC/switch 102 and a remote fiber link partner. The clocking scheme is taught in the co-pending U.S. application Ser. No. 10/347,295, titled, "A Physical Layer Device Having a SerDes Pass-Through Mode," filed Jan. 1, 2003, and incorporated above by reference in its entirety.

In accordance with the present invention, the PHY 106 selectively interfaces with the MAC/switch 102 in SGMII mode using the SGMII module 202 and an SGMII interface 104a, or in the SerDes pass-through mode using the SerDes pass-through module 324 and a 1000-X interface 104b, depending upon whether an active copper and/or fiber link partner is detected.

For example, when a fiber link partner is detected, the MAC/switch 102 communicates with the fiber link partner through the 1000-X interface 104b. Conversely, when an active copper link partner is detected, the PHY 106 auto-negotiates with the MAC/switch 102 to operate in the SGMII mode.

The invention optionally provides for prioritization of fiber or copper media links when both fiber and copper active link partners are detected, as described below.

V. Mode Selection

The detection of one or more active link partners can be used to select a mode of operation without user intervention. Selection of the SGMII mode or the SerDes pass-through mode is now described.

Selection of the SGMII mode or the SerDes pass-through mode is controlled by the mode selector 330. The mode selector 330 includes a copper link detect node 332 and a fiber signal detect ("SD") node 334. The copper link detect node 332 is coupled to the copper link detect signal filter 314 to receive the filtered copper link detect signal 316. When an active copper link partner is detected by the copper link detect circuitry 312, the copper link detect signal filter 314 outputs the filtered copper link detect signal 316 to the copper link detect node 332.

The fiber SD node 334 is coupled to the fiber SD signal filter 318. When an intensity of an optical signal on the fiber link media 116b is above a threshold, the filtered active fiber SD signal 320 is provided to the mode selector 330 through the fiber SD node 334.

The mode selector 330 is functionally illustrated with a switch module 336 controlled by mode selector logic 338. The mode selector logic 338 outputs a mode select signal 340 to the switch module 336. The mode select signal 340 controls the switch module 336 to route data 342 between the MAC/switch 102 and the SGMII module 202 or the SerDes pass-through module 204.

The data 342 includes transmit and receive data. The data 342 optionally includes auto-negotiation data. When the data 342 is routed to the SGMII module 202, the PHY 106 is said to operate in the SGMII mode. When the data 342 is routed the SerDes pass-through module 204, the PHY 106 is said to operate in the SerDes pass-through mode. The functional illustration of FIG. 3 is provided for exemplary purposes. The invention is not, however, limited to the functional illustration of FIG. 3.

The mode selector logic 338 includes logic and/or embedded software that processes the filtered fiber SD signal 320 and the filtered copper link detect signal 316 to select a mode of operation. Table 1 below is an example truth table illustrating logic and/or embedded software implemented by mode selector 330.

TABLE 1

| Fiber SD Signal 308/320 | Copper Link Detect Signal 310/316 | Mode Selected by the Mode Selector 330 |
|---|---|---|
| 0 | 0 | Configurable |
| 0 | 1 | SGMII Mode |
| 1 | 0 | SerDes Pass-Through Mode |
| 1 | 1 | Configurable |

When the filtered copper link detect signal 316 is active and the filtered fiber SD signal 320 is inactive, SGMII mode is selected. Similarly, when the filtered copper link detect signal 316 is inactive and the filtered fiber SD signal 320 is active, SerDes pass-through mode is selected. When SGMII mode is selected, the PHY 106 interfaces between the MAC/switch and the copper link 116a through the SGMII module 202. When SerDes pass-through mode is selected, the PHY 106 interfaces between the MAC/switch 102 and the fiber link 116b through the SerDes Pass-Through module 204.

The mode selector 330 provides optionally configurable states as well. A first optionally configurable state applies when no active link is detected on either the copper link 116a or the fiber link 116b. A second optionally configurable state applies when active links are detected on both the copper link 116a and the fiber link 116b. The mode selector 330 is optionally configurable for either or both of these situations. In other words, the mode selector 330 can be configured to default to SGMII or SerDes pass-through mode in one or both of the situations. Alternatively, the mode selector 330 can be configured to default to SGMII mode for one of the two situations, and to SerDes pass-through mode for the other situation. This configurability essentially allows prioritization of SGMII or SerDes pass-through mode. The priorities can be configurable through logic settings and/or software.

VI. Powering Down Unselected Media

The detection of one or more active link partners can be used to power down, in whole or in part, circuitry associated with an unselected mode of operation, as now described. In the example of FIG. 3, the optional power-down feature is implemented with an optional power-down module 346. When the SerDes pass-through mode is selected, the power-down module 346 powers down the SGMII module 202, or portions thereof. When SGMII mode is selected, the power-down module 346 powers down the SerDes Pass-Through module 204, or portions thereof.

In the example of FIG. 3, the power-down module 346 is controlled by the mode selector 330. Alternatively, the power-down module 346 receives the copper link detect signal 310, the fiber SD signal 308, the filtered copper link detect signal 316, and/or the filtered fiber SD signal 320, directly, and determines whether to power-down the SGMII module 202 or the SerDes Pass-Through module 204, in whole or in part.

The default priorities discussed above can be employed by the power down module 346. For example, when priority is set to SerDes pass-through mode, and when both the copper link 116a and the fiber link 116b are active, the SGMII module 202 is powered down, in whole or in part. This would prevent a copper link partner attached to the copper link 116a from attempting to link up since no energy is transmitted into the copper link 116a by the SGMII module 202 when it is powered down.

The default priorities discussed above can be further used to prevent the prioritized mode circuitry from being completely powered down. In other words, if the prioritized media is currently inactive, then the circuitry associated with the prioritized media would not be powered down. This allows the PHY 106 to detect a subsequently active link partner and switch to the prioritized mode.

For example, when priority is set to fiber mode, and only the copper link 116a is active, SGMII mode is selected, but the SerDes Pass-Through module 204 is not powered down, or at least not completely powered down. This allows the PHY 106 to detect a subsequently active fiber link partner and switch to fiber mode. In this case, the SGMII module 202 can then be powered down in whole or in part.

The optional power-down module 346 can be implemented as disclosed in one or more of the following co-pending U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and/or Ser. No. 10/231,066, titled, "Auto Powerdown for Forced Speed Modes," filed Aug. 30, 2002.

All of which are incorporated herein by reference in their entireties. The invention is not, however, limited to the embodiments disclosed therein.

Figure 4:
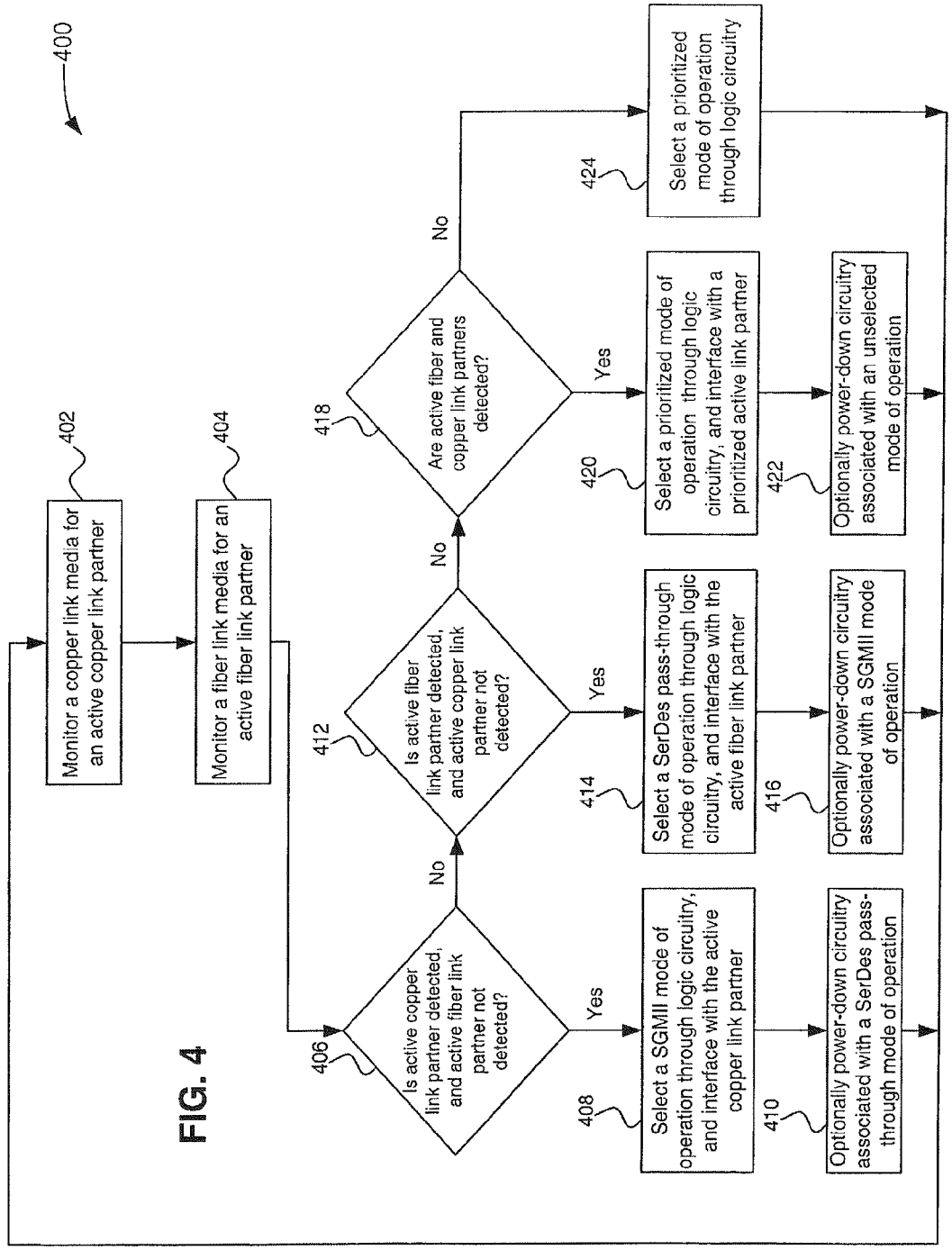
FIG. 4 is a process flowchart 400 for detecting active link partners, for selecting an appropriate mode of operation, and for powering down unselected media, in accordance with the invention.

VII. Methods for Detecting Active Link Partners, for Selecting a Mode of Operation, and for Powering Down Unselected Media FIG. 4 is a process flowchart 400 for operating a physical layer device ("PHY") in an Ethernet network. More particularly, the process flowchart 400 illustrates a method for detecting active link partners, for selecting an appropriate mode of operation, and for powering down unselected media, in accordance with the invention. The process flowchart 400 is described with reference to one or more of the example block diagrams in FIGS. 1-3. The process flowchart 400 is not, however, limited to the example block diagrams in FIGS. 1-3. Based on the description herein, one skilled in the relevant art(s) will understand that the process flowchart 400 can be implemented with other Ethernet module implementations as well.

The process begins at step 402, which includes monitoring a copper link media for an active copper link partner.

Step 404 includes monitoring a fiber link media for an active fiber link partner.

In step 406, if an active copper link partner is detected and an active fiber link partner is not detected, processing proceeds to step 408. In step 408, a serial gigabit media independent ("SGMII") mode of operation is selected for the PHY, and the PHY interfaces with the active copper link partner in the SGMII mode of operation, substantially as described above.

Processing optionally proceeds to step 410, which includes powering down circuitry associated with a serialize/deserialize ("SerDes") pass-through mode of operation. The powering down operation can be a partial or complete powering down operation. Processing then returns to step 402, which can be repeated when the PHY detects a link partner change.

Referring back to step 406, and following the path to step 412, if an active fiber link partner is detected and an active copper link partner is not detected, processing proceeds to step 414. In step 414, a SerDes pass-through mode of operation is selected for the PHY, and the PHY interfaces with the active fiber link partner in the SerDes pass-through mode of operation, substantially as described above.

Processing optionally proceeds to step 416, which includes powering down circuitry associated with the SGMII mode of operation. The powering down operation can be a partial or complete powering down operation. Processing then returns to step 402, as described above.

Referring back to step 412, and following the path to step 418, if active fiber and copper link partners are detected, processing proceeds to step 420. In step 420, a prioritized mode of operation is selected for the PHY, and the PHY interfaces with the associated active link partner in the prioritized mode of operation. For example, when the SGMII mode of operation is prioritized, the SGMII mode of operation is selected, and the PHY interfaces with the active copper link partner in the SGMII mode of operation. Alternatively, when the SerDes pass-through mode of operation is prioritized, the SerDes pass-through mode of operation is selected, and the PHY interfaces with the active fiber link partner in the SerDes pass-through mode of operation. Preferably, a mode of operation can be prioritized by a user through hardware, software, firmware, and/or combinations thereof. Alternatively, priority is factory-set.

Processing optionally proceeds to step 420, which includes powering down circuitry associated with an unselected mode of operation. The powering down operation can be a partial or complete powering down operation. Processing then returns to step 402, as described above.

Referring back to step 418, if no active fiber or copper link partners are detected, processing proceeds to step 424. In step 422, a prioritized mode of operation is selected for the PHY. Processing then returns to step 402, as described above.

VIII. Integration in a Multi-Mode PHY

Figure 5:
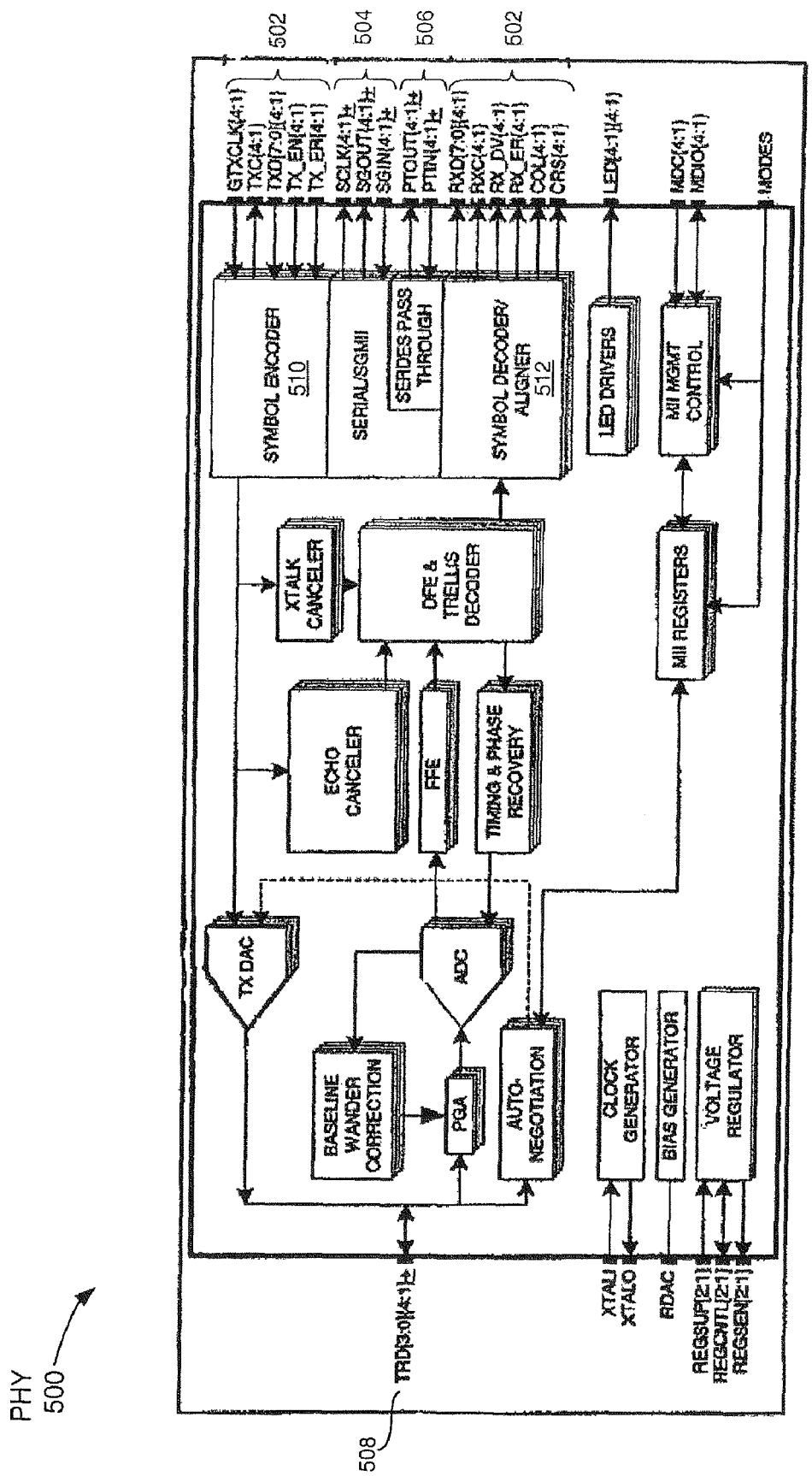
FIG. 5 is a block diagram of a multi-mode physical layer device 700 in which the present invention can be implemented.

The present invention can be implemented within a multi-mode PHY integrated circuit ("IC") that is designed to interface with MACs, switches, and/or optical devices through one or more of SGMII, SerDes, and or other interface formats. For example, FIG. 5 is a block diagram of a multi-mode PHY IC 500 in which the present invention can be implemented.

The PHY IC 500 includes serial/SGMII ports 504 that can used as input ports or output ports. As input ports, the serial/SGMII ports 504 can be coupled to an SGMII MAC/switch 102, a 1000-X MAC/switch 102, or any other type of serial MAC/switch. As output ports, the serial/SGMII ports 504 can be coupled to a fiber physical link media.

The PHY 500 further includes SerDes pass-through ports 506, which can be used in a SerDes pass-through mode (1000-X), described above, wherein a SerDes signal is received from a SerDes MAC/switch 102, or optical device, via serial/SGMII ports 504, for example, and passed through SerDes pass-through ports 506 to another SerDes device.

The SerDes interface can be used in at least three applications. First, the SerDes interface can be connected to a SerDes fiber module in a fiber-to-copper media-converter application. Second, the SerDes interface can be connected to a SerDes MAC or switch for SerDes MAC-to-copper application. Third, the SerDes interface can be put into the pass-through mode, described herein, where serial data (1000-X) is communicated between the MAC SerDes and another SerDes interface. The SerDes interface transmits serial data differentially at 1.25 GBaud via the SGOUT± pin, and receives differentially via the SGIN± pin. The SerDes interface pins are shared with the SGMII interface pins 504.

The SerDes interface can be implemented to handle a 1.25 Gbaud data signal with a 625 MHz clock (DDR interface). Each signal is generated as a differential pair to provide signal integrity and minimize noise. All three speeds, 10, 100, and 1000, of the GMII can be supported in the new interface for backward compatibility.

The PHY IC 500 also includes a copper port 508, which couples to a copper link. The PHY IC 500 also includes copper mode circuitry for processing data sent and/or received through the copper port 508, including echo cancellation circuitry, cross-talk cancellation circuitry, equalization circuitry, timing and phase recovery circuitry, gain control circuitry, and baseline wander correction circuitry.

The PHY 500 IC also includes parallel data ports 502 that can be coupled to a MII/GMII MAC/switch.

IX. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A physical layer device (PHY), comprising:
   a fiber signal detect node configured to detect when an intensity of an optical signal on a fiber link media is above a threshold to determine whether the fiber link media is active;
   a copper link detect circuitry configured to determine whether a copper physical link media is active; and
   a mode selector, coupled to the fiber signal detect node and the copper link detect circuitry, configured to select a fiber mode of operation when the fiber link media is active or to select a copper mode of operation when the copper physical link media is active.

2. The PHY of claim 1, wherein the copper link detect circuitry is configured to determine whether a copper link partner is active on the copper physical link media.

3. The PHY of claim 1, further comprising:
   a fiber connector configured to couple the fiber signal detect node to the fiber link media; and
   a copper connector configured to couple the copper link detect circuitry to the copper physical link media.

4. The PHY of claim 1, wherein the copper mode of operation is a serial gigabit media independent interface (SGMII) mode of operation.

5. The PHY of claim 1,
   wherein the fiber mode of operation is a serializer/deserializer (SerDes) pass-through mode of operation, and further comprising:
   a SerDes pass-through module configured to pass an electrical signal from the fiber link media to the mode selector in the SerDes pass-through mode of operation.

6. The PHY of claim 5, wherein the SerDes pass-through module comprises:
   a first SerDes configured to de-serialize data received from the fiber link media; and
   a second SerDes configured to re-serialize data received from the first SerDes.

7. The PHY of claim 5, further comprising:
   an optical-to-electrical converter configured to convert the optical signal on the fiber link media to the electrical signal.

8. The PHY of claim 1,
   wherein the fiber mode of operation is characterized as having a higher priority than the copper mode of operation, and
   wherein the mode selector is configured to select the fiber mode of operation when the fiber link media and the copper physical link media are active.

9. The PHY of claim 1,
   wherein the fiber mode of operation is characterized as having a lower priority than the copper mode of operation, and
   wherein the mode selector is configured to select the copper mode of operation when the fiber link media and the copper physical link media are active.

10. The PHY of claim 1, wherein the mode selector comprises:
    a switch module configured to select between routing data received from the fiber link media or routing data received from the copper physical link media in response to a mode select signal; and
    a mode selector logic configured to provide the mode select signal to the switch module, the mode select signal indicating whether one or more of the fiber link media and the copper physical link media are active.

11. The PHY of claim 1, further comprising:
    a power-down module configured to power down the fiber signal detect node when the copper mode of operation is selected and to power down the copper link detect circuitry when the fiber mode of operation is selected.

12. A physical layer device (PHY), comprising:
    a fiber signal detect node configured to determine whether a fiber link media is active;
    a copper link detect circuitry configured to determine whether a copper physical link media is active;
    a mode selector, coupled to the fiber signal detect node and the copper link detect circuitry, configured to select a fiber mode of operation when the fiber link media is active or to select a copper mode of operation when the copper physical link media is active; and an optical-to-electrical converter configured to convert an optical signal on the fiber link media to an electrical signal, the optical-to-electrical converter including a fiber signal detect port, the fiber signal detect port being configured to be active when an intensity of the optical signal on the fiber link media is above a threshold.

13. The PHY of claim 12, wherein the optical-to-electrical converter is configured to provide an active fiber detect signal to the fiber signal detect node, the fiber signal detect node being configured to indicate the fiber link media is active.

14. A method for selecting a mode of operation of a physical layer device (PHY), comprising:
(a) detecting when an intensity of an optical signal on a fiber link media is above a threshold to determine whether the fiber link media is active;
(b) determining whether a copper physical link media is active; and
(c) selecting a fiber mode of operation when the fiber link media is active or a copper mode of operation when the copper physical link media is active.

15. The method of claim 14, wherein step (a) comprises:
(a)(i) converting the optical signal on the fiber link to an electrical signal; and
(a)(ii) activating a fiber signal detect port when the intensity of the optical signal on the fiber link media is above the threshold.

16. The method of claim 15, wherein step (a) further comprises:
(a)(iii) providing an active fiber detect signal indicating the fiber link media is active.

17. The method of claim 14, wherein step (b) comprises:
(b)(i) determining whether a copper link partner is active on the copper physical link media.

18. The method of claim 14, further comprising:
(d) coupling the fiber signal detect node to the fiber link media using a fiber, connector; and
(e) coupling the copper link detect circuitry to the copper physical link media using a copper connector.

19. The method of claim 14, wherein the copper mode of operation is a serial gigabit media independent interface (SGMII) mode of operation.

20. The method of claim 14, wherein step (c) comprises:
(c)(i) selecting a serializer/deserializer (SerDes) pass-through mode of operation when the fiber link media is active.

21. The method of claim 20, further comprising:
(d) passing an electrical signal from the fiber link media in the SerDes pass-through mode of operation.

22. The method of claim 21, wherein step (d) comprises:
(d)(i) de-serializing, by a first SerDes, data received from the fiber link media; and
(d)(ii) re-serializing, by a second SerDes, data received from the first SerDes.

23. The method of claim 14, wherein the fiber mode of operation is characterized as having a higher priority than the copper mode of operation, and wherein step (c) comprises:
(c)(i) selecting the fiber mode of operation when the fiber link media and the copper physical link media are active.

24. The method of claim 14, wherein the fiber mode of operation is characterized as having a lower priority than the copper mode of operation, and wherein step (c) comprises:
(c)(i) selecting the copper mode of operation when the fiber link media and the copper physical link media are active.

25. The method of claim 14, wherein step (c) comprises:
(c)(i) providing a mode select signal indicating whether one or more of the fiber link media and the copper physical link media are active; and
(c)(ii) selecting between routing data received from the fiber link media or routing data received from the copper physical link media in response to the mode select signal.

* * * * *

UNITED STATES PATENT AND TRADEMARK OFFICE
CERTIFICATE OF CORRECTION

| | | |
|---|---|---|
| PATENT NO. | : 8,238,257 B2 | Page 1 of 1 |
| APPLICATION NO. | : 12/840645 | |
| DATED | : August 7, 2012 | |
| INVENTOR(S) | : Gary S. Huff | |

It is certified that error appears in the above-identified patent and that said Letters Patent is hereby corrected as shown below:

At column 13, line 36, please replace "fiber, connector" with --fiber connector--.

Signed and Sealed this
Thirtieth Day of October, 2012

David J. Kappos
*Director of the United States Patent and Trademark Office*